UNITED STATES PATENT OFFICE.

MEILICH MELAMID, OF FREIBURG, GERMANY.

PROCESS OF MANUFACTURING PURE RESIN-OIL.

1,131,939.

Specification of Letters Patent. Patented Mar. 16, 1915.

No Drawing. Original application filed November 18, 1912, Serial No. 732,141. Divided and this application filed June 10, 1913. Serial No. 772,838.

*To all whom it may concern:*

Be it known that I, MEILICH MELAMID, a subject of the Czar of Russia, and resident of Freiburg, in the Grand Duchy of Baden, German Empire, have invented a new and useful Improved Process of Manufacturing Pure Resin-Oil, the application being divided out from my copending application for Letters Patent, Serial No. 732,141, filed November 18, 1912, which matured as Letters Patent 1,092,448, April 7, 1914, of which the following is a specification.

If phosphoric acid is added to resin oil, the purifying effect thereby obtained is not of an appreciable degree, and if said acid is mixed with resin and the mixture is heated to 260° C., only a dark very viscous resin oil is obtained, but not an oil which is clear like water and has an aromatic taste. Such a result, however, is obtained by employing a higher temperature, viz. 300° C. or more. The resin oil then obtained is clear like water, odorless, and forms an excellent substitute for turpentine oil.

If resin is heated together with phosphoric acid to 260° C. at the utmost, then that point only is reached at which the phosphoric acid has not yet got converted into another phosphorus compound, but remains phosphoric acid and acts as such a one. At this temperature, the purifying action of the phosphoric acid is hardly of an appreciable degree, as already said, but if the temperature is raised to 300° C. or more, the phosphoric acid is converted into various other phosphorus compounds for instance pyro- and meta-phosphoric acid. Since these substances differ materially from that acting at the lower temperature, viz. from phosphoric acid acting at 260° C., also the results or products are materially different.

My invention now consists in heating resin together with phosphoric acid to a temperature of about 300° C. or more at which said acid is converted into several other phosphorus compounds, for instance pyro- and meta-phosphoric acid.

The process may for instance be carried out as follows: 100–150 kilograms of technical phosphoric acid are heated to about 300° C. or more and 1000 kilograms of resin are melted separately in a caldron or the like at about 150° C. Now the two substances are mixed with each other and this mixture is quickly heated to about 300° C., after which the distillation is effected. Or 10 kilograms of technical phosphoric acid are heated in a still to about 300° C. or more, and after this 1000 kilograms of resin in a liquid state are passed through that phosphoric acid. In either case about 20% of the products obtained by thus treating the resin consists of a substitute for turpentine oil and about 80% consists of a clear and odorless resin oil. Besides resin, also distillates may be treated in the before-described manner and may be further and further purified by the same.

Having now described my invention, what I desire to secure by a patent of the United States is:

1. The process for producing pure resin oils, consisting in mixing resin and phosphoric acid, heating the mixture to a temperature at which said acid is converted into pyro-phosphoric acid and meta-phosphoric acid, and then letting these compounds act upon the resin, substantially as described.

2. The process for producing pure resin oils, consisting in adding phosphoric acid to resin, heating the composition to about 300° C. and more so as to cause said acid to be converted into pyro-phosphoric acid and meta-phosphoric acid, and letting these compounds act upon the resin, substantially as described.

3. The process for producing pure resin oils, consisting in heating resin and phosphoric acid to a temperature at which said acid is converted into pyro-phosphoric acid, substantially as described.

4. The process for producing pure resin oils, consisting in mixing distillates of resin and phosphoric acid, heating the mixture to a temperature at which said acid is converted into pyro-phosphoric acid and meta-phosphoric acid, and then letting these compounds act upon the resin, substantially as described.

5. The process for producing pure resin oils consisting in adding phosphoric acid to distillates of resin, heating the composition to about 300° C. and more so as to cause said acid to be converted into pyro-phosphoric acid and meta-phosphoric acid, and then letting these compounds act upon the resin, substantially as described.

In testimony whereof I affix my signature in presence of two witnesses.

Dr. MEILICH MELAMID.

Witnesses:
 A. DELK,
 H METZGROL.